US008264962B2

(12) United States Patent
Vasseur et al.

(10) Patent No.: US 8,264,962 B2
(45) Date of Patent: Sep. 11, 2012

(54) SYSTEM AND METHOD FOR DYNAMICALLY RESPONDING TO EVENT-BASED TRAFFIC REDIRECTION

(75) Inventors: Jean-Philippe Vasseur, Dunstable, MA (US); David D. Ward, Somerset, WI (US); Stefano B. Previdi, Rome (IT); Clarence Filsfils, Brussels (BE)

(73) Assignee: Cisco Technology, Inc., San Jose, CA (US)

( * ) Notice: Subject to any disclaimer, the term of this patent is extended or adjusted under 35 U.S.C. 154(b) by 954 days.

(21) Appl. No.: 11/168,694

(22) Filed: Jun. 27, 2005

(65) Prior Publication Data

US 2006/0291391 A1    Dec. 28, 2006

(51) Int. Cl.
G01R 31/08    (2006.01)
(52) U.S. Cl. ...................................... 370/235
(58) Field of Classification Search .......... 370/252, 370/310, 389, 241, 254, 413, 235; 709/238
See application file for complete search history.

(56) References Cited

U.S. PATENT DOCUMENTS

| | | | | |
|---|---|---|---|---|
| 6,665,273 | B1 * | 12/2003 | Goguen et al. | 370/252 |
| 6,876,668 | B1 | 4/2005 | Chawla et al. | |
| 7,336,605 | B2 * | 2/2008 | Bruckman et al. | 370/230 |
| 7,522,624 | B2 * | 4/2009 | Barri et al. | 370/413 |
| 7,558,215 | B2 * | 7/2009 | Rajan | 370/254 |
| 2002/0093954 | A1 * | 7/2002 | Weil et al. | 370/389 |
| 2002/0156914 | A1 * | 10/2002 | Lo et al. | 709/238 |
| 2003/0039246 | A1 * | 2/2003 | Guo et al. | 370/389 |
| 2005/0088966 | A9 | 4/2005 | Stewart | |
| 2005/0128951 | A1 | 6/2005 | Chawla et al. | |
| 2005/0259586 | A1 * | 11/2005 | Hafid et al. | 370/241 |
| 2007/0189194 | A1 * | 8/2007 | Hrastar | 370/310 |

OTHER PUBLICATIONS

Rekhter, Y., RFC 1771, entitled A Border Gateway Protocol 4 (BGP-4), Mar. 1995, pp. 1-28.
Smit, H., RFC 3784, entitled Intermediate-System-to-Intermediate-System (IS-IS) Extensions for Traffic Engineering (TE), Jun. 2004, pp. 1-13.
Callon, R., RFC 1195, entitled use of OSI ISIS for routing in TCP/IP and Dual Environments, Dec. 1990, pp. 1-80.
Awduche, D. et al., RFC 3209, entitled RSVP-TE: Extensions to RSVP for LSP Tunnels Dec. 2001, pp. 1-43.

(Continued)

Primary Examiner — Anh-Vu H Ly
Assistant Examiner — Gbemileke Onamuti
(74) Attorney, Agent, or Firm — Cesari and McKenna, LLP

(57) ABSTRACT

A technique dynamically resizes Traffic Engineering (TE) Label Switched Paths (LSPs) at a head-end node of the TE-LSPs in preparation to receive redirected traffic in response to an event in a computer network. The novel dynamic TE-LSP resizing technique is based on the detection of an event in the network that could cause traffic destined for one or more other ("remote") head-end nodes of one or more TE-LSPs to be redirected to an event-detecting ("local") head-end node of one or more TE-LSPs. An example of such a traffic redirection event is failure of a remote head-end node or failure of any of its TE-LSPs. Specifically, the local head-end node maintains TE-LSP steady state sampling and resizing frequencies to adapt the bandwidth of its TE-LSP(s) to gradual changes in the network over time. Upon detection of an event identifying possible traffic redirection, the local head-end node enters a Fast Resize (FR) state, in which the sampling and resizing frequencies are increased to quickly adapt the TE-LSP bandwidth(s) to any received redirected traffic.

28 Claims, 10 Drawing Sheets

OTHER PUBLICATIONS

Katz, D. et al., RFC 3630, entitled Traffic Engineering (TE) Extensions to OSPF Version 2, Sep. 2003, pp. 1-14.
Braden, R. et al., RFC 2205, entitled Resource ReSerVation Protocol (RSVP), Version 1 Functional Specification, Sep. 1997, pp. 1-112.
Berger, L., RFC 3473, entitled Generalized Multi-Protocol Label Switching (GMPLS) Signaling Resource ReserVation Protocol-Traffic Engineering (RSVP-TE) Extensions, Jan. 2003, pp. 1-40.
Moy, J., RFC 2328, entitled OSPF Version 2, Apr. 1998, pp. 1-183.
Mannie, E., RFC 3945, entitled Generalized Multi-Protocol Label Switching (GMPLS) Architecture, Oct. 2004, pp. 1-65.
Mannie, E., RFC 3946, entitled Generalized Multi-Protocol Label Switching (GMPLS) Extensions for Synchronous Optical Network (SONET) and Synchronous Digital Hierarchy (SDH) Control, Oct. 2004, pp. 1-25.
Vasseur, et al., Internet Draft, entitled OSPF MPLS Traffic Engineering Capabilities (draft-vasseur-ospf-te-caps-00.txt), Jul. 2004, pp. 1-14.
Vasseur, et al., Internet Draft, entitled IS-IS MPLS Traffic Engineering Capabilities (draft-vasseur-isis-te-caps-00.txt), Jul. 2004, pp. 1-15.
Vasseur, J.P. et al., RSVP Path Computation Request and Reply Messages (draft-vasseur-mpls-computation-rsvp-05.txt), Internet Draft, Jul. 2004, pp. 1-31.
Pan et al., Fast Reroute Extensions to RSVP-TE for LSP Tunnels (draft-ietf-mpls-rsvp-lsp-fastreroute-07.txt), Internet Draft, Feb. 2005 pp. 1-35.
Cisco Systems, White Paper, entitled Cisco MPLS AutoBandwidth Allocator for MPLS Traffic Engineering: A Unique New Feature of Cisco IOS Software, 2001, 4 Pages.

* cited by examiner

| NODE 605 | POSSIBLE TRAFFIC REDIRECTION 610 |
|---|---|
| P1 | YES |
| n1 | NO |
| n2 | NO |
| n3 | NO |
| ⋮ | ⋮ |

LIST 600

ENTRIES 615

FIG. 6

SYSTEM AND METHOD FOR DYNAMICALLY RESPONDING TO EVENT-BASED TRAFFIC REDIRECTION

BACKGROUND OF THE INVENTION

1. Field of the Invention

The present invention relates to computer networks and more particularly to dynamically responding to event-based traffic redirection in a computer network

2. Background Information

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS or an area is generally referred to as a "domain," and a router that interconnects different domains together is generally referred to as a "border router."

An example of an interdomain routing protocol is the Border Gateway Protocol version 4 (BGP), which performs routing between domains (ASes) by exchanging routing and reachability information among neighboring interdomain routers of the systems. An adjacency is a relationship formed between selected neighboring (peer) routers for the purpose of exchanging routing information messages and abstracting the network topology. The routing information exchanged by BGP peer routers typically includes destination address prefixes, i.e., the portions of destination addresses used by the routing protocol to render routing ("next hop") decisions. Examples of such destination addresses include IP version 4 (IPv4) and version 6 (IPv6) addresses. BGP generally operates over a reliable transport protocol, such as TCP, to establish a TCP connection/session. The BGP protocol is well known and generally described in Request for Comments (RFC) 1771, entitled *A Border Gateway Protocol 4* (BGP-4), published March 1995.

Examples of an intradomain routing protocol, or an interior gateway protocol (IGP), are the Open Shortest Path First (OSPF) routing protocol and the Intermediate-System-to-Intermediate-System (IS-IS) routing protocol. The OSPF and IS-IS protocols are based on link-state technology and, therefore, are commonly referred to as link-state routing protocols. Link-state protocols define the manner with which routing information and network-topology information are exchanged and processed in a domain. This information is generally directed to an intradomain router's local state (e.g., the router's usable interfaces and reachable neighbors or adjacencies). The OSPF protocol is described in RFC 2328, entitled *OSPF Version 2*, dated April 1998 and the IS-IS protocol used in the context of IP is described in RFC 1195, entitled *Use of OSI IS-IS for routing in TCP/IP and Dual Environments*, dated December 1990, both of which are hereby incorporated by reference.

An intermediate network node often stores its routing information in a routing table maintained and managed by a routing information base (RIB). The routing table is a searchable data structure in which network addresses are mapped to their associated routing information. However, those skilled in the art will understand that the routing table need not be organized as a table, and alternatively may be another type of searchable data structure. Although the intermediate network node's routing table may be configured with a predetermined set of routing information, the node also may dynamically acquire ("learn") network routing information as it sends and receives data packets. When a packet is received at the intermediate network node, the packet's destination address may be used to identify a routing table entry containing routing information associated with the received packet. Among other things, the packet's routing information indicates the packet's next-hop address.

To ensure that its routing table contains up-to-date routing information, the intermediate network node may cooperate with other intermediate nodes to disseminate routing information representative of the current network topology. For example, suppose the intermediate network node detects that one of its neighboring nodes (i.e., adjacent network nodes) becomes unavailable, e.g., due to a link failure or the neighboring node going "off-line," etc. In this situation, the intermediate network node can update the routing information stored in its routing table to ensure that data packets are not routed to the unavailable network node. Furthermore, the intermediate node also may communicate this change in network topology to the other intermediate network nodes so they, too, can update their local routing tables and bypass the unavailable node. In this manner, each of the intermediate network nodes becomes "aware" of the change in topology.

Typically, routing information is disseminated among the intermediate network nodes in accordance with a predetermined network communication protocol, such as a link-state protocol (e.g., IS-IS, or OSPF). Conventional link-state protocols use link-state advertisements or link-state packets (or "IGP Advertisements") for exchanging routing information between interconnected intermediate network nodes (IGP nodes). As used herein, an IGP Advertisement generally describes any message used by an IGP routing protocol for communicating routing information among interconnected IGP nodes, i.e., routers and switches. Operationally, a first IGP node may generate an IGP Advertisement and "flood" (i.e., transmit) the packet over each of its network interfaces coupled to other IGP nodes. Thereafter, a second IGP node may receive the flooded IGP Advertisement and update its routing table based on routing information contained in the received IGP Advertisement. Next, the second IGP node may flood the received IGP Advertisement over each of its network interfaces, except for the interface at which the IGP Advertisement was received. This flooding process may be repeated until each interconnected IGP node has received the IGP Advertisement and updated its local routing table.

Multi-Protocol Label Switching (MPLS) Traffic Engineering has been developed to meet data networking requirements such as guaranteed available bandwidth or fast restoration. MPLS Traffic Engineering exploits modern label switching techniques to build guaranteed bandwidth end-to-end tunnels through an IP/MPLS network of label switched routers (LSRs). These tunnels are a type of label switched path (LSP) and thus are generally referred to as MPLS Traffic Engineering (TE) LSPs. Examples of MPLS TE can be found in RFC 3209, entitled *RSVP-TE: Extensions to RSVP for LSP Tunnels* dated December 2001, RFC 3784 entitled *Intermediate-System-to-Intermediate-System (IS-IS) Extensions for Traffic Engineering (TE)* dated June 2004, and RFC 3630, entitled *Traffic Engineering (TE) Extensions to OSPF Version 2* dated September 2003, the contents of all of which are hereby incorporated by reference in their entirety.

Establishment of an MPLS TE-LSP from a head-end LSR to a tail-end LSR involves computation of a path through a network of LSRs. Optimally, the computed path is the "shortest" path, as measured in some metric, that satisfies all relevant LSP Traffic Engineering constraints such as e.g., required bandwidth, "affinities" (administrative constraints to avoid or include certain links), etc. Path computation can either be performed by the head-end LSR or by some other entity operating as a path computation element (PCE) not co-located on the head-end LSR. The head-end LSR (or a PCE) exploits its knowledge of network topology and resources available on each link to perform the path computation according to the LSP Traffic Engineering constraints. Various path computation methodologies are available including CSPF (constrained shortest path first). MPLS TE-LSPs can be configured within a single domain, e.g., area, level, or AS, or may also span multiple domains, e.g., areas, levels, or ASes.

The PCE is an entity having the capability to compute paths between any nodes of which the PCE is aware in an AS or area. PCEs are especially useful in that they are more cognizant of network traffic and path selection within their AS or area, and thus may be used for more optimal path computation. A head-end LSR may further operate as a path computation client (PCC) configured to send a path computation request to the PCE, and receive a response with the computed path, potentially taking into consideration other path computation requests from other PCCs. It is important to note that when one PCE sends a request to another PCE, it acts as a PCC.

Some applications may incorporate unidirectional data flows configured to transfer time-sensitive traffic from a source (sender) in a computer network to a destination (receiver) in the network in accordance with a certain "quality of service" (QoS). Here, network resources may be reserved for the unidirectional flow to ensure that the QoS associated with the data flow is maintained. The Resource ReSerVation Protocol (RSVP) is a network-control protocol that enables applications to reserve resources in order to obtain special QoS for their data flows. RSVP works in conjunction with routing protocols to, e.g., reserve resources for a data flow in a computer network in order to establish a level of QoS required by the data flow. RSVP is defined in R. Braden, et al., *Resource ReSerVation Protocol (RSVP)*, RFC 2205. In the case of traffic engineering applications, RSVP signaling is used to establish a TE-LSP and to convey various TE-LSP attributes to routers, such as border routers, along the TE-LSP obeying the set of required constraints whose path may have been computed by various means.

Generally, TE-LSPs are configured with static (i.e., fixed) constraints, such as bandwidth size. A system administrator with knowledge of the network characteristics may configure the TE-LSPs in accordance with desired capabilities, such as, e.g., to handle a known maximum average load level. For instance, if traffic traversing a particular TE-LSP has a daily maximum value of 5 Megabytes/second (MB), the administrator may configure the TE-LSP to reserve 5 MB.

One problem with statically configured TE-LSPs is that they do not adapt to changes in traffic patterns over the TE-LSP. In some cases, the traffic traversing a TE-LSP may significantly vary upon the time of day, days in a week, etc. Various algorithms have been proposed to adequately and dynamically resize a TE-LSP based on the measured traffic load (e.g., with low pass filters). For example, a resizing algorithm may consist of measuring or "sampling" the average load (bandwidth) for a short period of time (e.g., a sample rate or frequency of 5 mins). The TE-LSP may be resized after a longer period of time (e.g., a resize frequency of 1 hour) based on the maximum average load of the sampled periods for the past resizing period.

A common practice in TE-enabled networks consists of deploying a mesh of TE-LSPs between a plurality of edge devices (provider edge, or PE routers) through a core network of fewer (generally large capacity) routers (provider, or P routers). In a mesh (e.g., a "full mesh"), each PE router on one side of the core is connected to each PE router on the other side of the core via a TE-LSP. The mesh of TE-LSPs provides various benefits within the network, as known to those skilled in the art. In certain network configurations (e.g., with a large number of PE routers), however, this results in a large number of TE-LSPs throughout the network. For example, in the event there are 100 PE routers on each side of the core network, a total of 1000 TE-LSPs are necessary to create a full mesh. Generally, there are more (e.g., 5 to 10 times more) PE routers than there are P routers in the network, so one solution to limit the number of TE-LSPs in the network has been to create a mesh of TE-LSPs between the P routers, and not the PE routers. This may significantly reduce the number of TE-LSPs, such as by a factor of, e.g., 25-100. The PE routers may then communicate with the P routers through conventional routing, e.g., IP or MPLS routing.

Occasionally, a network element (e.g., a node or link) will fail, causing redirection of the traffic that originally traversed the failed network element to other network elements that bypass the failure. Generally, notice of this failure is relayed to the nodes in the same domain through an advertisement of the new network topology, e.g., an IGP Advertisement, and routing tables are updated to avoid the failure accordingly. Typically, both IP traffic and any TE-LSPs are redirected to avoid a failure in a manner known to those skilled in the art. In the above case where a mesh of TE-LSPs are provided between P routers, if any one of the P routers fails, all TE-LSPs originating at that P router also fails. As the network becomes aware of the change in topology and converges, the PE routers start redirecting their traffic to another available P router in the core in order to reach the other side. This condition leads to a burst of traffic redirected to TE-LSPs originating at other P routers (also referred to in the art as "traffic sloshing"). These TE-LSPs, however, may not be appropriately sized to handle the large burst of new traffic, thus rendering the traffic engineering mechanisms inaccurate and less efficient during the failure of a P router.

Particularly, a statically configured TE-LSP is unable to adapt to any changes in traffic patterns, much less a burst of traffic due to a failure of a P router. One solution to this static TE-LSP limitation is to configure each TE-LSP with a size that could handle such a failure; however to do so the TE-LSP would need to be much larger than necessary for conventional traffic, and hence would be an inefficient use of network resources. A dynamically sized TE-LSP, on the other hand, would eventually resize to an appropriate size, depending upon the sample/resize frequencies of the TE-LSP. Slow sample/resize frequencies would not react efficiently (e.g., quickly) enough to compensate for the burst of traffic. Conversely, fast sample/resize frequencies would react efficiently to the burst of traffic, yet, during steady states, the faster frequencies may create more frequent changes to the TE-LSP, resulting in excess signaling messages and possible network instability. Also, when a failed node is restored or a new node is added, the TE-LSPs that were resized to compensate for the redirected traffic may have reserved the available resources of the network in a way that prevents the restored/new node from establishing the appropriate TE-LSPs, leading to double booking problems (at least temporarily).

SUMMARY OF THE INVENTION

The present invention is directed to a technique for dynamically resizing Traffic Engineering (TE) Label Switched Paths (LSPs) at a head-end node of the TE-LSPs in preparation to receive redirected traffic in response to an event in a computer network. The novel dynamic TE-LSP resizing technique is based on the detection of an event in the network that could cause traffic destined for one or more other ("remote") head-end nodes of one or more TE-LSPs to be redirected to an event-detecting ("local") head-end node of one or more TE-LSPs. An example of such a traffic redirection event is failure of a remote head-end node or failure of any of its TE-LSPs. Specifically, the local headend node maintains TE-LSP steady state sampling and resizing frequencies to adapt the bandwidth of its TE-LSP(s) to gradual changes in the network over time. Upon detection of an event identifying possible traffic redirection, the local head-end node enters a Fast Resize (FR) state, in which the sampling and resizing frequencies are increased to quickly adapt the TE-LSP bandwidth(s) to any received redirected traffic.

In the illustrative embodiment described herein, the event notification is transmitted using Interior Gateway Protocol (IGP) messages. Each node (e.g., router) within the network may create an IGP message that is used to propagate ("advertise") the event notification to other routers in its domain, e.g., its IGP area/level. The event may be, e.g., a network topology change, a reachability announcement, or a refresh message. The IGP message is illustratively embodied as an Open Shortest Path First (OSPF) or Intermediate-System-to-Intermediate-System (IS-IS) advertisement message ("IGP Advertisement"), respectively. Notably, the IGP Advertisement may include a novel type/length/value (TLV) encoded format used to convey other information.

In accordance with one aspect of the present invention, the local head-end node learns of an event through conventional notification means, e.g., the IGP Advertisements. In particular, the local head-end node detects an event identifying possible traffic redirection through a notification indicating a network topology change. In certain configurations (e.g., forwarding adjacencies), the local head-end node may also be adapted to determine the type of topology change prior to identifying possible traffic redirection. For instance, the local head-end node may identify possible traffic redirection in the event of a failure/removal of a remote head-end node or any of its TE-LSPs, and not where a link within the forwarding adjacency has failed. Additionally, the local head-end node may also maintain a list of routers (or links) for which their failure/removal identifies possible traffic redirection, such as, e.g., where the router is a head-end node. This list may be configured at the local head-end node, or may be learned through advertisements from routers within the network, e.g., through the novel TLV encoded format of the IGP Advertisements.

In accordance with another aspect of the present invention, upon receiving notification of an event identifying possible traffic redirection, the local head-end node enters % an FR state. In the FR state, preconfigured (faster) sampling and resizing frequencies are initiated to quickly adapt its TE-LSP bandwidth(s) to any received redirected traffic. After expiration of a configurable timer, the frequencies may be returned to their steady state values, since the redirection of traffic, e.g., from a remote head-end node to the local head-end node, may generally only be a short burst until the necessary traffic is redirected. In the event the failed/removed network element (e.g., a remote head-end node) is restored, or a new element added, the local head-end node may substantially immediately return its TE-LSPs to an original (i.e., pre traffic redirection) bandwidth. Alternatively, the local head-end node may reenter an FR state to quickly adapt (e.g., decrease) the bandwidth (size) of its TE-LSPs to account for the traffic redirection to the restored/added network element. Notably, the restored/added remote head-end node may also reestablish its original TE-LSPs, or enter a FR state to quickly adapt (e.g., increase) the bandwidth (size) of its TE-LSPs to account for the received redirected traffic.

Advantageously, the novel technique dynamically resizes TE-LSP bandwidths at a head-end node of the TE-LSPs in preparation to receive redirected traffic in response to an event in a computer network. By dynamically adjusting the frequency of sampling/resizing TE-LSPs, the inventive technique provides a mechanism for efficiently responding to traffic redirection in which traffic is quickly shifted from a remote head-end node to a local head-end node. Accordingly, the novel technique avoids inefficient manual configuration of TE-LSP size to cope with traffic redirection, as well as the problems associated with fixed TE-LSP sample/resize frequencies.

BRIEF DESCRIPTION OF THE DRAWINGS

The above and further advantages of the invention may be better understood by referring to the following description in conjunction with the accompanying drawings in which like reference numerals indicate identical or functionally similar elements, of which:

FIG. 6 is a schematic block diagram of portions of an exemplary list that may be advantageously used with the present invention;

DETAILED DESCRIPTION OF AN ILLUSTRATIVE EMBODIMENT

Figure 1:
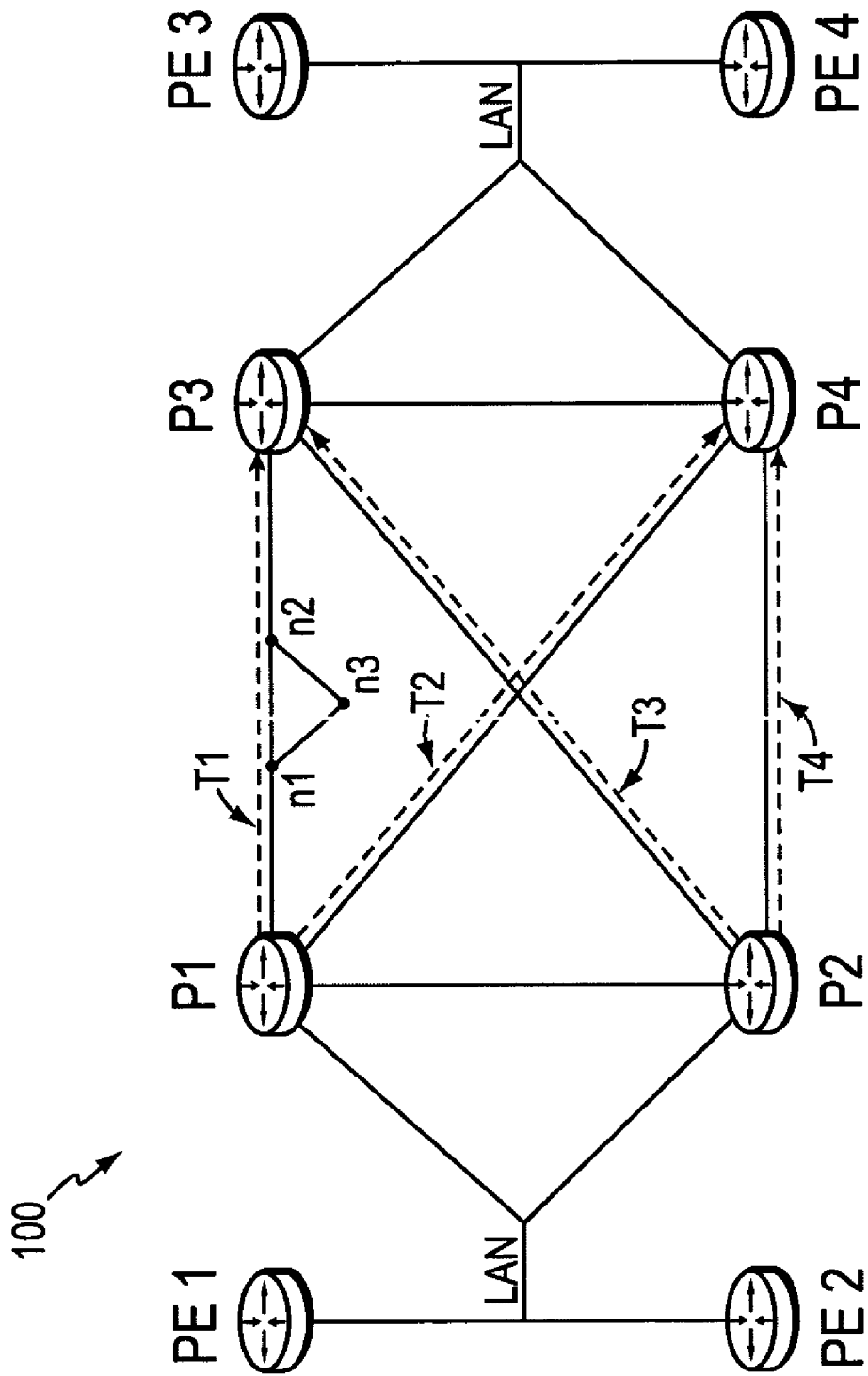
FIG. 1 is a schematic block diagram of an exemplary computer network that may be used in accordance with the present invention.

FIG. 1 is a schematic block diagram of an exemplary computer network 100 comprising edge devices (provider edge routers) PE1 and PE2 interconnected to PE3 and PE4 by provider (core) routers P1-P4 (e.g., through links as shown). A core router is generally defined as a router that is part of a core or "backbone" (i.e., the collection of provider routers P1-P4) that serves as a "pipe" through which all traffic from peripheral networks must pass on its way to other peripheral networks. Because of this, the core routers (and the links connecting them) are commonly designed to accommodate a high volume of traffic, such as, e.g., links with 2.5 GB (gigabytes) or 10 GB of bandwidth (such as optical connections OC48 or OC192, respectively). Illustratively, a collection of nodes (e.g., routers) n1-n3 is shown between provider routers P1 and P3. The edge routers PE1-PE4 may connect to the peripheral networks (not shown), and acts as access points (points of presence, POP) to the computer network for other devices of the peripheral network. Notably, the core may be organized as a meshed network, in which the devices are organized in a manageable, segmented manner known to those skilled in the art. Moreover, each edge router (PE1-PE4) may be connected to multiple core routers (e.g., in a "mesh" fashion) over a Local Area Network (LAN), providing redundancy for each edge router to the core. Those skilled in the art will understand that any number of routers and nodes may be used in the computer network, and that the view shown herein is for simplicity. For example, more edge routers may be connected to the core (provider routers P1-P4) in a manner similar to PE1-PE4, e.g., with mesh connections to the core.

Data packets may be exchanged among the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc. Routing information may be distributed among the routers of the computer network using predetermined Interior Gateway Protocols (IGPs), such as conventional distance-vector protocols or, illustratively, link-state protocols, through the use of IGP Advertisements.

Figure 2:
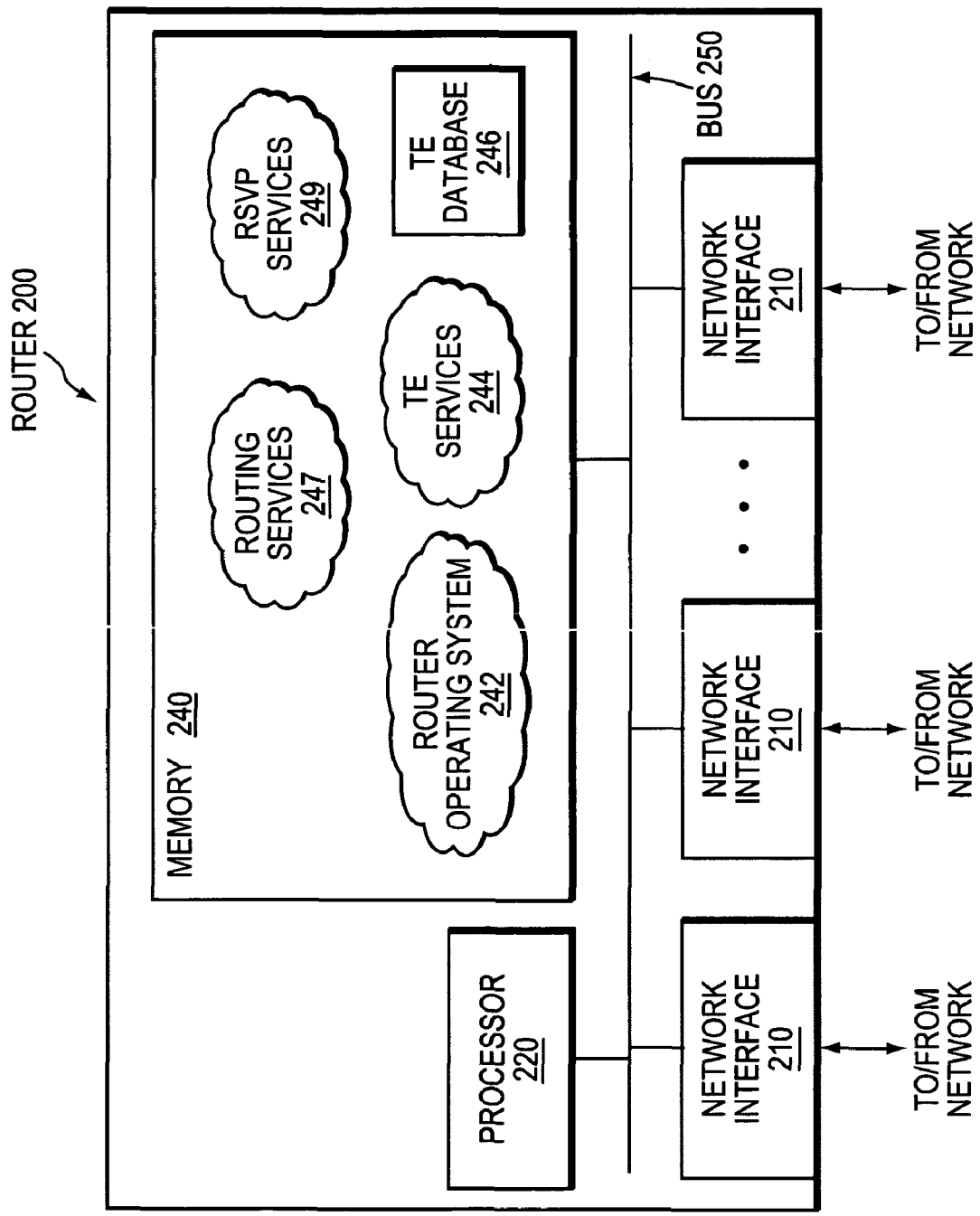
FIG. 2 is schematic block diagram of an exemplary router that may be advantageously used with the present invention.

FIG. 2 is a schematic block diagram of an exemplary router 200 that may be advantageously used with the present invention as an edge router or a core router. The router comprises a plurality of network interfaces 210, a processor 220, and a memory 240 interconnected by a system bus 250. The network interfaces 210 contain the mechanical, electrical and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc.

The memory 240 comprises a plurality of storage locations that are addressable by the processor 220 and the network interfaces 210 for storing software programs and data structures associated with the present invention. The processor 220 may comprise necessary elements or logic adapted to execute the software programs and manipulate the data structures, such as TE Database (TED) 246. A router operating system 242, portions of which is typically resident in memory 240 and executed by the processor, functionally organizes the router by, inter alia, invoking network operations in support of software processes and/or services executing on the router. These software processes and/or services include routing services 247, Traffic Engineering (TE) services 244, and RSVP services 249. It will be apparent to those skilled in the art that other processor and memory means, including various computer-readable media, may be used to store and execute program instructions pertaining to the inventive technique described herein.

Routing services 247 contain computer executable instructions executed by processor 220 to perform functions provided by one or more routing protocols, such as IGP, e.g. OSPF and IS-IS. These functions may be configured to manage a forwarding information database (not shown) containing, e.g., data used to make forwarding decisions. RSVP services 249 contain computer executable instructions for implementing RSVP and processing RSVP messages in accordance with the present invention. RSVP is described in RFC 2205, entitled *Resource ReSerVation Protocol (RSVP)*, and in RFC 3209, entitled *RSVP-TE: Extensions to RSVP for LSP Tunnels*, both as incorporated above.

TE services 244 contain computer executable instructions for operating TE functions in accordance with the present invention. Examples of Traffic Engineering are described in RFC 3209, RFC 3784, and RFC 3630 as incorporated above, and in RFC 3473, entitled, *Generalized Multi-Protocol Label Switching (GMPLS) Signaling Resource ReSerVation Protocol-Traffic Engineering (RSVP-TE) Extensions* dated January 2003, which is hereby incorporated by reference in its entirety. TED 246 is illustratively resident in memory 240 and used to store TE information provided by the routing protocols, such as IGP (with TE extensions, e.g., as described herein), including, inter alia, lists as described herein. The TED 246 is illustratively maintained and managed by TE services 244.

Changes in the network topology may be communicated among routers 200 using a link-state protocol, such as the conventional OSPF and IS-IS protocols. Suppose, for example, that a communication link fails or a cost value associated with a network node changes. Once the change in the network's state is detected by one of the routers, that router may flood an IGP Advertisement communicating the change to the other routers in the network. In this manner, each of the routers eventually "converges" to an identical view of the network topology.

Figure 3:
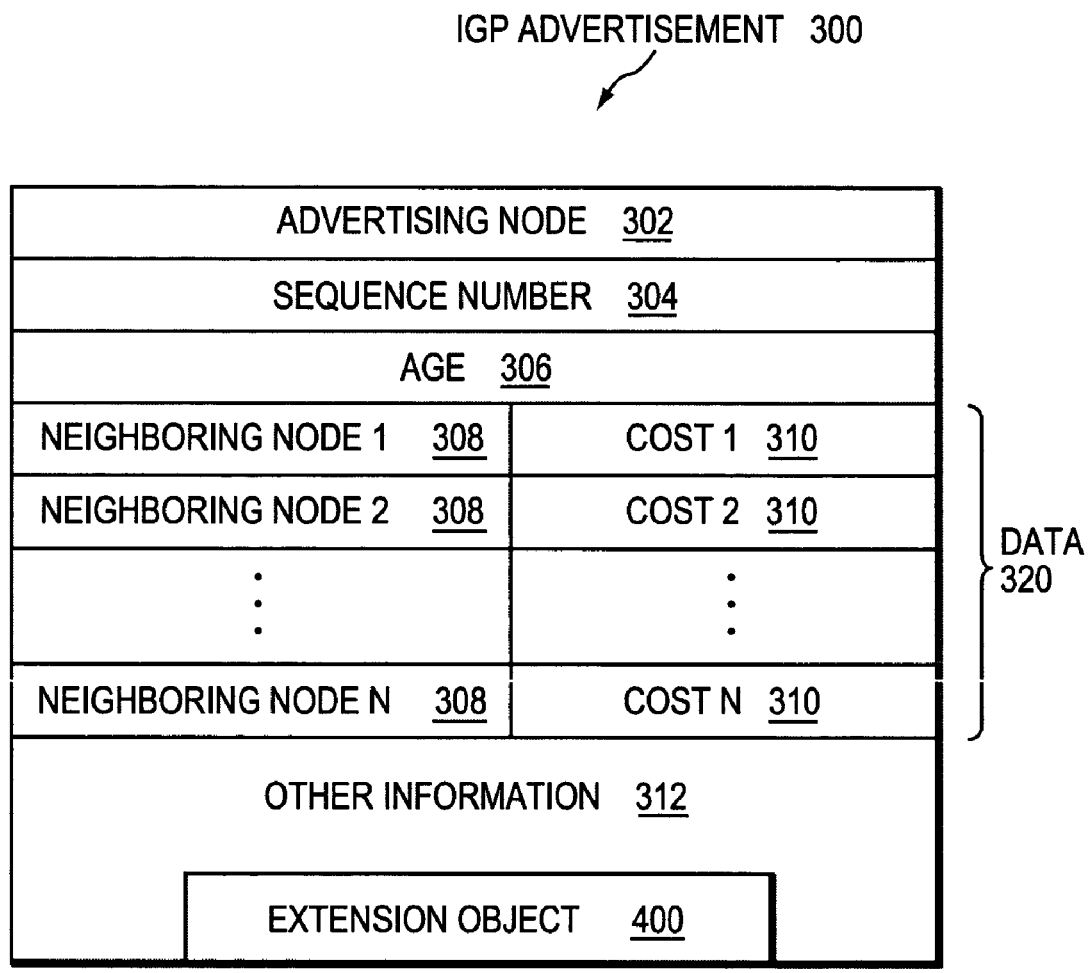
FIG. 3 is a schematic block diagram of an exemplary IGP Advertisement that may be flooded by the routers.

FIG. 3 illustrates an exemplary IGP Advertisement 300 that may be flooded by the routers 200. The packet includes an advertising-node field 302, a sequence-number field 304, an age field 306, a data section 320, and other routing information 312. The advertising-node field 302 stores a value that identifies the router that generated and originally broadcast the IGP Advertisement 300. The sequence-number field 304 stores a sequence number indicating the relative version of the IGP Advertisement. Typically, the sequence number stored in the field 304 is incremented, e.g., by one, for every new version of the IGP Advertisement. The IGP Advertisement 300 is therefore considered "stale" (invalid) if its sequence number is less than the sequence number stored in a previously-received version of the IGP Advertisement, i.e., generated by the same advertising node. Accordingly, the routers 200 may be configured to store and forward only the most recent version of an IGP Advertisement, e.g., the version having the largest sequence number.

The age field 306 also stores a value that may be used for determining whether the IGP Advertisement 300 is valid. The age value is typically initialized to a non-zero integer value, often in units of seconds. The age value may be decremented, e.g., by one every second, until the age value reaches zero, thereby indicating that the IGP Advertisement has become invalid. That is, every router 200 that stores or floods the IGP Advertisement 300 continuously ages the packet until the age value equals zero. Those skilled in the art will appreciate that other aging mechanisms alternatively may be used, such as incrementing the IGP Advertisement age value from an initial value, e.g., equal to zero, until the age value reaches a known upper limit.

The data section 320 includes one or more pairs of neighboring-node fields 308 and cost fields 310. Each neighboring-node field 308 stores a value, such as an address, indicating a network node that is directly accessible from the intermediate node stored in the advertising-node field 302. The field 310 stores a cost value that has been associated, e.g., by the advertising node, with the network node identified in the neighboring-node field 308. As shown, each neighboring-node field 308 is associated with only one corresponding cost field 310. However, it is noted that in other embodiments, a single neighboring node may be associated with a plurality of cost values. Other routing information 312 may also be included in the IGP Advertisement 300, such as checksum values, packet-length information, flag values, type-of-service metrics, etc., and/or an Extension Object 400 (described further below). Generally, the received IGP Advertisements are stored in a Link-State Database (LSDB) of the router 200 (not shown).

In one embodiment, the routers described herein are IP routers that implement Multi-Protocol Label Switching (MPLS) and operate as label switched routers (LSRs). In one simple MPLS scenario, at an ingress to a network, a label is assigned to each incoming packet based on its forwarding equivalence class before forwarding the packet to a next-hop router. At each router, a forwarding selection and a new substitute label are determined by using the label found in the incoming packet as a reference to a label forwarding table that includes this information. At the network egress (or one hop prior), a forwarding decision is made based on the incoming label but optionally no label is included when the packet is sent on to the next hop.

The paths taken by packets that traverse the network in this manner are referred to as label switched paths (LSPs) or Traffic Engineering (TE)-LSPs. An example TE-LSP is shown as the dashed lines and arrows (T1) between a head-end node (P1) and a tail-end node (P3) in FIG. 1. Establishment of a TE-LSP requires computation of a path, signaling along the path, and modification of forwarding tables along the path. MPLS TE establishes LSPs that have guaranteed bandwidth under certain conditions. Illustratively, the TE-LSPs may be signaled through the use of the RSVP protocol, and in particular, RSVP TE signaling messages. Notably, when incorporating the use of PCEs, the path computation request (and response) between PCC and PCE can be exchanged in accordance with a protocol specified in Vasseur, et al. *RSVP Path Computation Request and Reply Messages<draft-vasseur-mpls-computation-rsvp-05.txt>*, Internet Draft, July 2004, which is hereby incorporated by reference as though fully set forth herein. It should be understood that the use of RSVP serves only as an example, and that other communication protocols may be used in accordance with the present invention.

Although the illustrative embodiment described herein is directed to MPLS, it should also be noted that the present invention may advantageously apply to Generalized MPLS (GMPLS), which pertains not only to packet and cell-based networks, but also to Time Division Multiplexed (TDM) and optical networks. GMPLS is well known and described in RFC 3945, entitled *Generalized Multi-Protocol Label Switching (GMPLS) Architecture*, dated October 2004, and RFC 3946, entitled *Generalized Multi-Protocol Label Switching (GMPLS) Extensions for Synchronous Optical Network (SONET) and Synchronous Digital Hierarchy (SDH) Control*, dated October 2004, the contents of both of which are hereby incorporated by reference in their entirety.

To dynamically size and resize TE-LSPs, MPLS networks may be configured to automatically adjust the bandwidth (size) of the TE-LSPs based on how much traffic is flowing through the TE-LSPs. This automates the tasks of monitoring and then reconfiguring bandwidth for an MPLS TE-LSP, as opposed to manually tearing down and reestablishing the TE-LSP. For example, for every TE-LSP configured for dynamic resizing, the average output rate (e.g., amount of traffic) is sampled according to a sample frequency (e.g., 5 mins). The TE-LSP size (bandwidth) is then re-adjusted (resized) automatically based upon the largest average output rate noticed during a certain interval, according to a resize frequency (e.g., once every hour). In other words, the dynamic resizing algorithm monitors the average traffic (based on sample periods) over a TE-LSP for the length of a resize period, and then resizes a TE-LSP based upon the largest average for that period. Notably, the TE-LSP size may also be configured with an allowable maximum size. To resize the TE-LSP, a new TE-LSP is established requesting the new (resized) amount of resources. In the event the requested resources are unavailable, however, the TE-LSP will remain at the current value. An example of dynamically sized TE-LSPs is described further in "Cisco MPLS AutoBandwidth Allocator for MPLS Traffic Engineering: A Unique New Feature of Cisco IOS Software," a White Paper published by Cisco Systems, Inc., 2001, the contents of which are hereby incorporated by reference in its entirety.

In certain network configurations, a group of links, e.g., along a TE-LSP, may be advertised throughout the network as a "forwarding adjacency." A forwarding adjacency, generally, is an advertised TE link between two MPLS nodes that may or may not traverse one or more other nodes. For example, referring to FIG. 1, provider router P1 may advertise a forwarding adjacency to P3 as a single link, or "P1-P3," as opposed to advertising one of the possible physical routes, such as "P1-n1-n2-P3." Regardless of the actual traversed path between P1 and P3, network elements outside of the adjacency may only be aware of the single link P1-P3, and not any intervening topology. In some instances, the existence of the TE-LSP along the forwarding adjacency may only be known by the head-end node of the TE-LSP (e.g., the advertising node of the adjacency), and may appear only as a conventional physical link between the head-end node and the tail-end node of the TE-LSP. Notably, in the event the network is configured with forwarding adjacencies, (e.g., link P1-P3), network elements outside of the adjacency may remain unaware of any change in network topology within the adjacency, such as, e.g., due to conventional topology changes or network element failures.

To obviate delays associated with updating routing tables when attempting to avoid a failed network element (i.e., during convergence), some networks have employed MPLS TE fast reroute (FRR). MPLS FRR is a technique that may be used to quickly reroute traffic around failed network elements in a TE-LSP. MPLS FRR is further described, for example, by P. Pan, et al., in *Fast Reroute Extensions to RSVP-TE for LSP Tunnels <draft-ietf-mpls-rsvp-lsp-fastreroute-07.txt>*, available from the Internet Engineering Task Force (IETF). According to the technique, one or more links in a primary path are protected links (i.e., they are protected by an alternate path). If a failure occurs on a protected link or node, TE-LSPs (and consequently the traffic that they carry) are locally rerouted onto an appropriate alternate path (e.g., a "backup tunnel") by the node immediately upstream from the failure. The backup tunnel acts as an FRR path for the primary TE-LSP and obviates delays associated with other measures, such as tearing down the primary TE-LSP after having gracefully rerouted the TE-LSPs affected by the failure, should an alternate path around the failed network element exist. For example, referring back to FIG. 1, provider router P1 has a first TE-LSP T1 to P3 via a first path (through n1 and n2). Assume that the link between n1 and n2 is a protected link, and that a backup tunnel (not shown) has been created from n1 to n3 to n2. In the event of a failure of the link between n1 and n2, n1 (the head-end node of the backup tunnel) may quickly begin routing traffic over the backup tunnel with minimal disruption to traffic flow. Those skilled in the art will understand that MPLS FRR is one example of link or node failure protection, and that other known correction mechanisms may be used in accordance with the present invention.

In order for failure protection to function properly within a TE-LSP, the head-end node of the TE-LSP must remain operative, otherwise the TE-LSP itself will fail. In fact, when a head-end node fails, all TE-LSPs originating at that failed head-end node will also fail. As noted above, notice of this failure is relayed to the other nodes through an advertisement of the new network topology, e.g., an IGP Advertisement 300, and routing tables are updated to avoid the failure accordingly. For example, assume that in FIG. 1 provider router P1 fails (the head-end node for T1 and T2), and as PE1 and PE2 become aware of the failure, they start redirecting their traffic (originally bound for T1 and/or T2) to another available P router, P2, in order to reach the other side. Again, this condition (also referred to in the art as "traffic sloshing") leads to a burst of traffic redirected to T3 and/or T4, the TE-LSPs originating at P2. T3 and T4, however, may not be appropriately sized to handle the large burst of new traffic originally destined for T1 and T2.

The present invention is directed to a technique for dynamically resizing TE-LSPs at a head-end node of the TE-LSPs in preparation to receive redirected traffic in response to an event in a computer network. The novel dynamic TE-LSP resizing technique is based on the detection of an event in the network that could cause traffic destined for one or more other ("remote") head-end nodes of one or more TE-LSPs to be redirected to an event-detecting ("local") head-end node of one or more TE-LSPs. An example of such a traffic redirection event is failure of a remote head-end node or failure of any of its TE-LSPs. Specifically, the local head-end node maintains TE-LSP steady state sampling and resizing frequencies to adapt the bandwidth of its TE-LSP(s) to gradual changes in the network over time. Upon detection of an event identifying possible traffic redirection, the local head-end node enters a Fast Resize (FR) state, in which the sampling and resizing frequencies are increased to quickly adapt the TE-LSP bandwidth(s) to any received redirected traffic.

Figure 4:
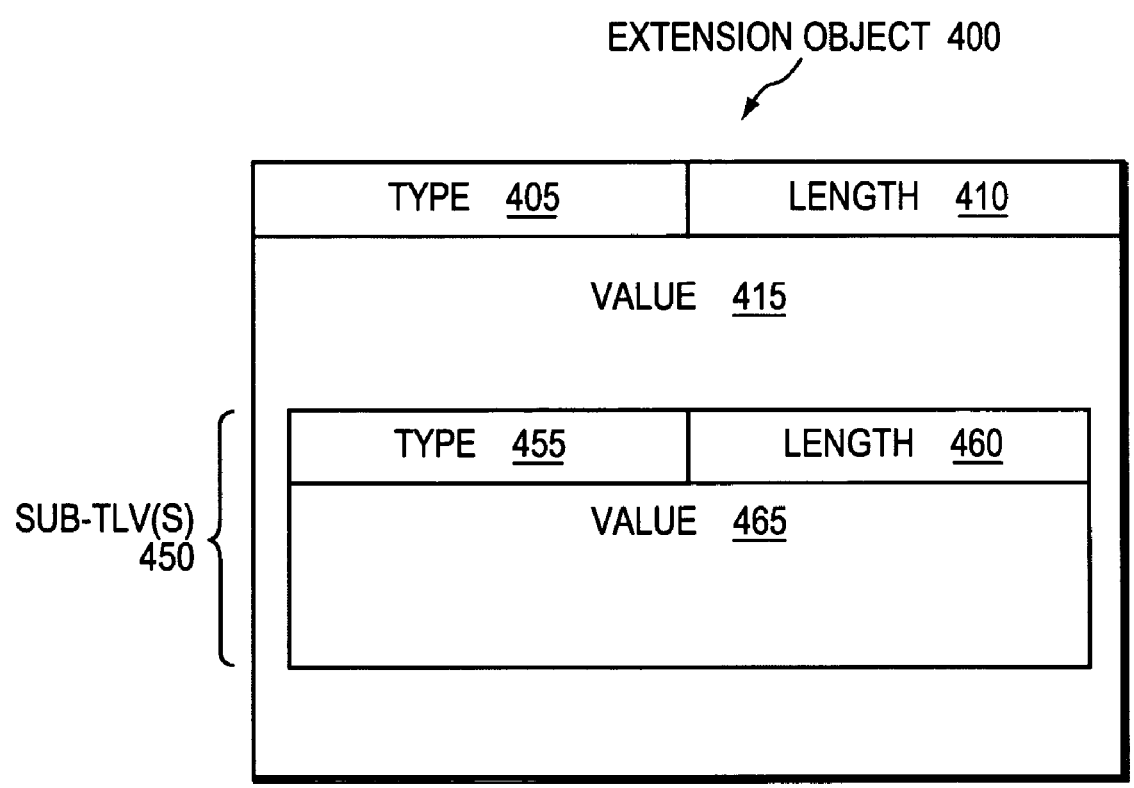
FIG. 4 is a schematic block diagram illustrating the format of an Extension Object that may be advantageously used with the present invention.

In the illustrative embodiment described herein, the event notification is transmitted using IGP messages. Each node (e.g., router) within the network may create an IGP message that is used to propagate ("advertise") the event notification to other routers in its domain, e.g., its IGP area/level. The event may be, e.g., a network topology change, a reachability announcement (e.g., a new prefix), or a refresh message. The IGP message is illustratively embodied as an Open Shortest Path First (OSPF) or Intermediate-System-to-Intermediate-System (IS-IS) advertisement message ("IGP Advertisement 300"), respectively. Notably, the IGP Advertisement may include a novel type/length/value (TLV) encoded format used to convey other information, such as Extension Object 400. FIG. 4 is a schematic block diagram illustrating an Extension Object 400 encoded using a TLV that may be advantageously used with the present invention. The TLV encoding format is a general way to communicate information between nodes, such as routers. The TLV "attribute" 400 is used to identify a type (T) of information being communicated (conveyed), a length (L) of information to be conveyed and a value (V) of the actual information conveyed. The length (L) parameter contained in the length field 410 is typically implementation-specific and can denote the length from the beginning of the Type field 405 of the attribute 400 to the end. However, the length generally denotes the length of the Value (V) field 415 and not the Type (T) or Length (L) fields. The TLV encoded format may also comprise one or more non-ordered sub-TLVs 450 carried within the TLV "payload" (e.g. Value field 415), each having a Type field 455, Length field 460, and Value field 465. The fields of the TLV 400 and sub-TLV(s) 450 are used in a variety of manners, including as described herein, according to the present invention.

In accordance with one aspect of the present invention, the local head-end node learns of an event through conventional notification means, e.g., the IGP Advertisements 300. In particular, the local head-end node detects an event identifying possible traffic redirection through a notification indicating a network topology change. A network topology change may be, e.g., a failed/removed network element (node, link, etc.) or a restored/added network element. Notably, the local head-end node may be configured to determine that a refresh message (e.g., with no topology changes) or an advertisement for new reachable prefix(es) are not notifications of topology changes, and hence do not identify possible traffic redirection.

Figure 5A:
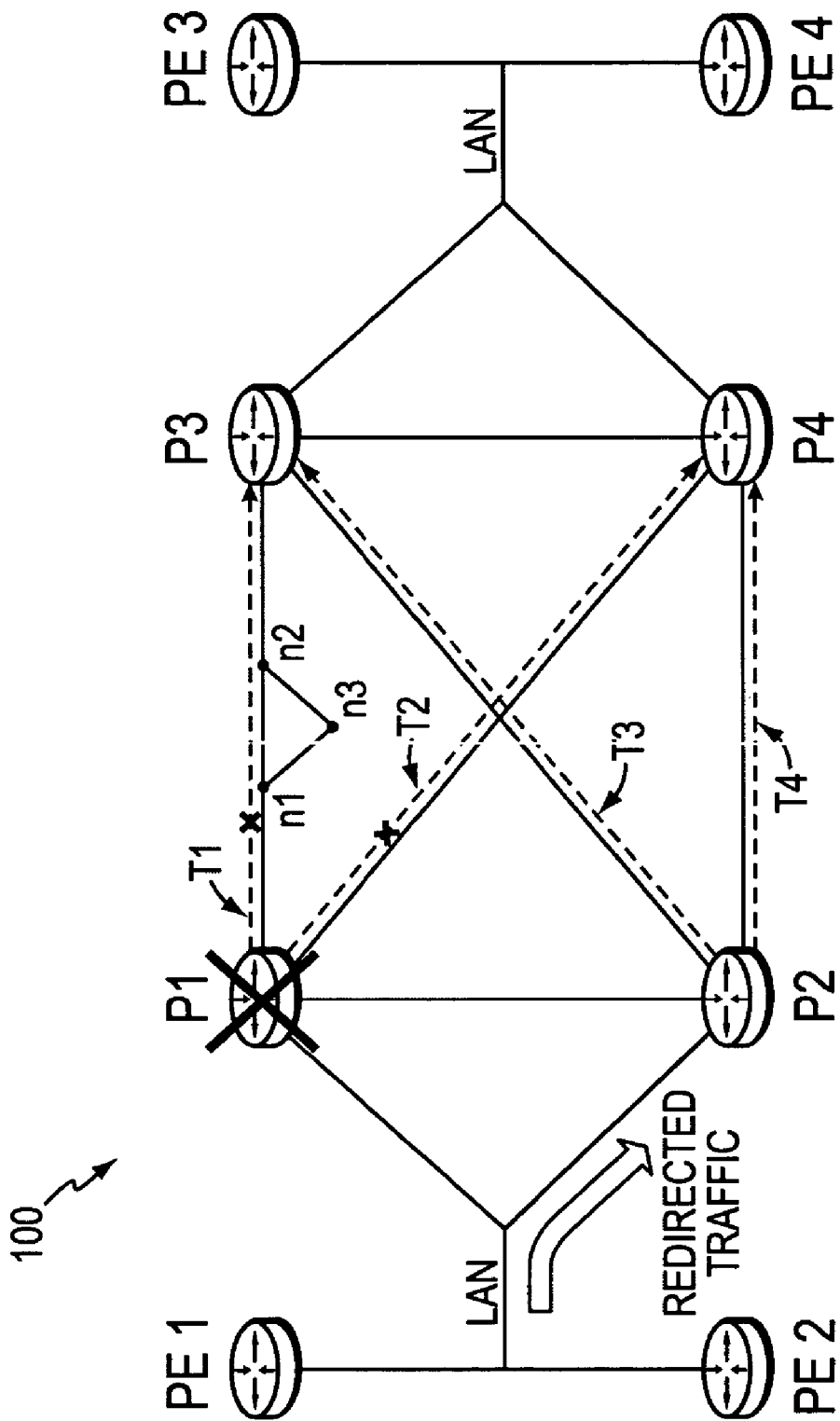
FIG. 5A is a schematic block diagram of the exemplary computer network in FIG. 1 in which a network event has occurred.

FIG. 5A is a schematic block diagram of the exemplary computer network in FIG. 1 in which a network event has occurred. In particular, assume that provider router P1 has failed (or has been removed). As P1 is the head-end node for TE-LSPs T1 and T2, T1 and T2 also fail accordingly. Nodes detecting the failure propagate a notification (IGP Advertisement 300) to the neighboring nodes indicating the topology change, which is then stored at the receiving nodes (e.g., PE1, PE2, and P2). As the network converges according to the new topology, PE routers (e.g., PE1 and PE2) that have selected P1 as their preferred P router may redirect their traffic destined for PE3 or PE4 from P1 to P2. Notably, P2 (or other P routers) may learn of the network event first-hand, that is, the other P routers may be the nodes that detect the failure initially. As such, those skilled in the art will understand that the notification of the event at P2 may not necessarily come from an external source.

In certain configurations (e.g., forwarding adjacencies), the local head-end node may also be adapted to determine the type of topology change prior to identifying possible traffic redirection. For instance, the local head-end node may identify possible traffic redirection in the event of a failure/removal of a remote head-end node or any of its TE-LSPs, and not where a link within the forwarding adjacency has failed. Specifically, the remote head-end node may correct a failure within the adjacency, as may any node along the adjacency that is so configured (as described above, e.g., MPLS FRR). In this case, no traffic redirection to another head-end node would be necessary, and, as in the case of a forwarding adjacency, nodes external to the adjacency may remain unaware that any changes have occurred within the adjacency.

To determine a specific type of topology change, the local head-end receiving the event notification may be configured to wait until expiration of a timer (e.g., 30 seconds) after the initial notification so that further notifications may be received. In particular, types of topology changes generally reference nodes or links (or SRLGs, Shared Risk Link Groups). To determine a specific type of notification, the local head-end node examines the received notifications as well as the pre-event topology of the network (e.g., as stored in the LSDB). For example, if the event involves a node change (e.g., a node removal), the head-end node receives an adjacency failure notification originating from each known neighbor of the removed node (e.g., as stored in the LSDB). If, on the other hand, the event involves a link change (e.g., a link failure), the local head-end node receives adjacency failure notifications originating from only two nodes, i.e., indicating that the link between the two nodes has changed. Those skilled in the art will understand that other methods to determine the type of topology change may be used advantageously with the present invention, and that the above description is merely an example.

Referring again to FIG. 5A, for example, assume the topology change was caused by the failure of a P router (P1), which is a head-end node for TE-LSPs. In this instance, P2 detects an adjacency failure with P1, which indicates either that the link between P1 and P2 has failed, or that P1 itself has failed. P2 initiates the configurable timer, and waits to receive further notifications about P1. Accordingly, P2 may receive notifications from P1's neighbors, e.g., PE1, PE2, P3, P4, etc., that an adjacency failure occurred with P1. P2 may assume that it is P1 that has failed, and not the link between P1 and P2. As such, P2 may now predict that possible traffic redirection may occur, in accordance with the present invention. Had the failure been the link between P1 and P2, P2 may have been configured to predict that possible traffic redirection may not occur.

Figure 5B:
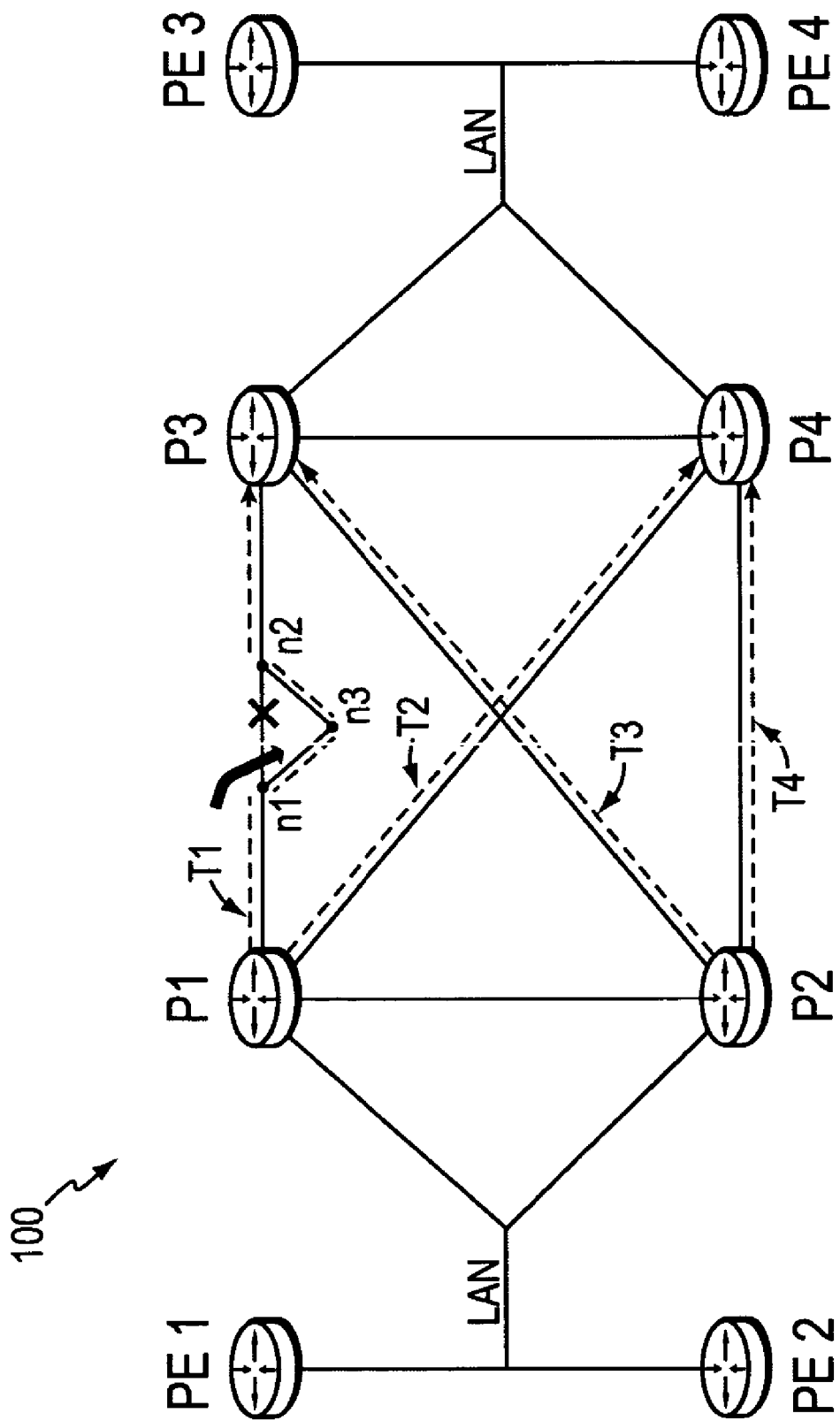
FIG. 5B is a schematic block diagram of the exemplary computer network in FIG. 1 in which a network event has occurred.

FIG. 5B is a schematic block diagram of the exemplary computer network in FIG. 1 in which a network event has occurred. In FIG. 5B, assume that the link between n1 and n2 has failed. In the case where the nodes between P1 and P3 are within a forwarding adjacency, P2 (or any other node outside of the adjacency) may not be notified of the failure. However, in the event that P2 is notified, P2 again begins the timer to await further notifications. In this instance, only n1 and n2 originate a notification, thereby indicating a link failure. Illustratively, P2 may be configured to predict that possible traffic redirection may not occur based solely on a link failure, because the head-end node P1 of the TE-LSPs (e.g., T1) is still operational and is generally configured to reroute the TE-LSPs accordingly (i.e., the PE routers still direct their traffic to P1). As noted above, T1 may have various failure protection techniques in place, such as MPLS FRR over a backup tunnel via n1-n3-n2, and traffic that remains directed to P1 is rerouted accordingly to P3 as shown.

Figure 5C:
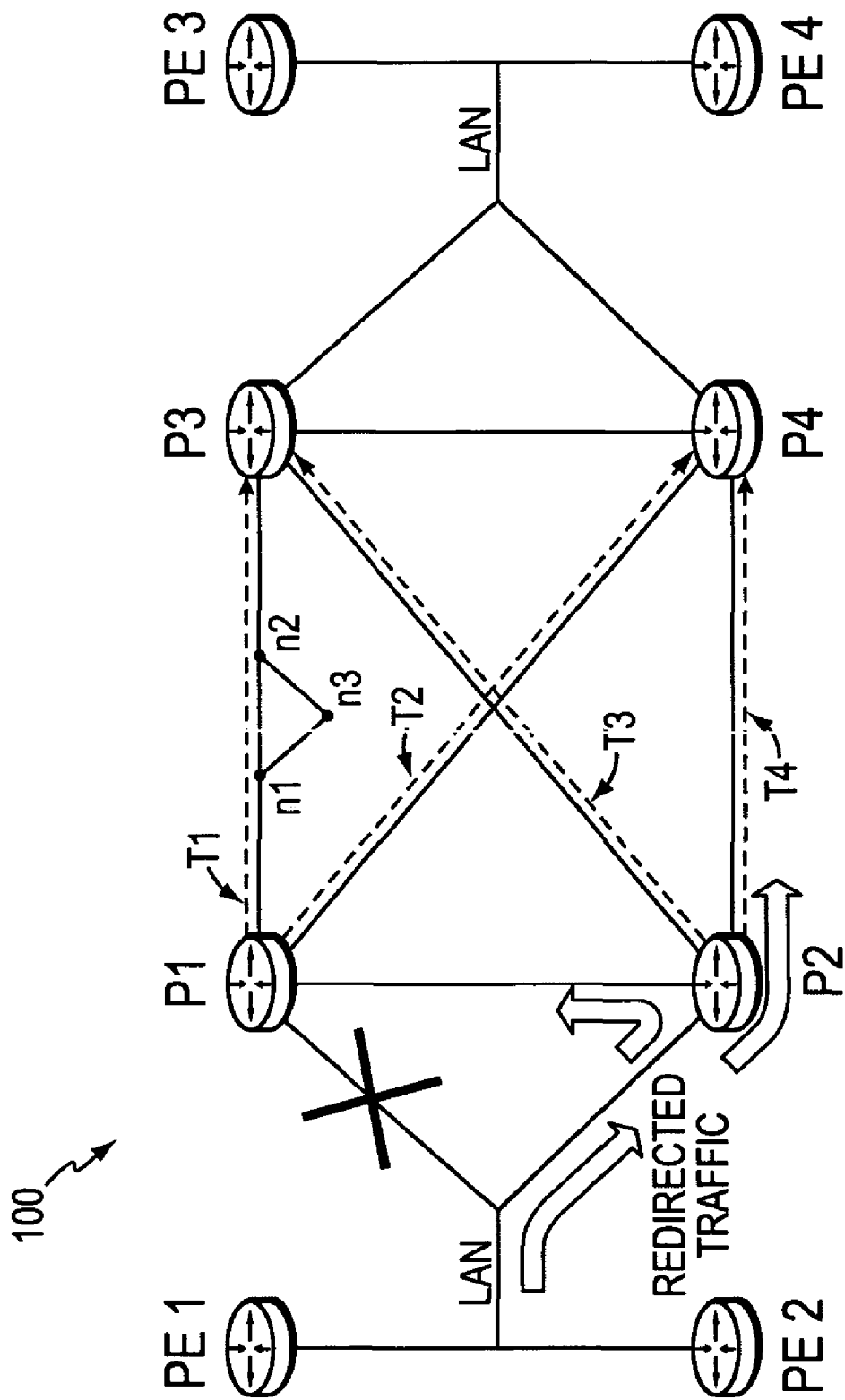
FIG. 5C is a schematic block diagram of the exemplary computer network in FIG. 1 in which a network event has occurred.

FIG. 5C is a schematic block diagram of the exemplary computer network in FIG. 1 in which a network event has occurred. As another example of a link failure, assume in FIG. 5C that the link between the LAN and P1 has failed. In this instance, the PE routers (PE1 and PE2) redirect their traffic to P2 over the remaining link, however, P2 may still forward the traffic to P1 if there is a link available as shown. Because there is a possibility that traffic may be redirected over the TE-LSPs originating at P2, although not a certainty, P2 may be configured to predict that traffic redirection may occur over its TE-LSPs in this instance, in accordance with the present invention. Notably, the local headend nodes (P2) may be configured to determine where the link is located (e.g., within a forwarding adjacency, between PE routers and P routers, etc.), prior to determining whether traffic redirection may occur. Moreover, some P routers may be configured to predict that possible traffic redirection may occur in response to any topology change, and as such, any node or link change is considered an event that may result in traffic redirection.

Additionally, the local head-end node may also maintain a list of routers (or links) for which their failure/removal identifies possible traffic redirection, such as, e.g., where the router is a head-end node. This list may be configured at the local head-end node (such as where a system administrator has knowledge of the TE-LSPs and their head-end nodes), or may be learned through advertisements from routers within the network, e.g., through the novel TLV encoded format (Extension Object 400) of the IGP Advertisements 300 (such as where the TE-LSPs are automatically and dynamically created).

Notably, the information contained within the Extended Object 400 indicates whether the failure/removal of a node identifies possible traffic redirection (or that the node is a head-end node of one or more TE-LSPs). This information may be configured as specific values, flags, access lists, etc., understood by those skilled in the art. Indication of whether the failure/removal of a node identifies possible traffic redirection (or that the node is a head-end node of one or more TE-LSPs) may be a value within the Value field 415 or a sub-TLV 450. Those skilled in the art will understand that other formats of the information are within the scope of the present invention, and that those formats shown herein for illustration are not meant to be limiting in any way. Examples of TLV encoding formats that may be used to specify various MPLS TE information about nodes/routers, e.g., whether their failure/removal identifies possible traffic redirection (or that the node is a head-end node of one or more TE-LSPs) are described in *OSPF MPLS Traffic Engineering Capabilities* (*draft-vasseur-ospf-te-caps.txt*) published July 2004, and *IS-IS MPLS Traffic Engineering Capabilities* (*draft-vasseur-isis-te-caps.txt*) published July 2004, both by Vasseur et al., both of which are expressly incorporated by reference in their entirety. Those skilled in the art will understand that other means for transmitting the desired information are possible, and that the use of IGP Advertisements 300 and/or Extension Objects 400 is merely representative.

FIG. 6 is a schematic block diagram of portions of an exemplary list 600 that may be advantageously used with the present invention. The list 600 contains a plurality of fields or entries 615 that store the routers for which their failure/removal identifies possible traffic redirection, designated by fields including, inter alia, Node field 605, and Possible Traffic Redirection field 610. The fields of the list 600 may be populated by a number of means, such as, e.g., through received IGP advertisements 300 or manual configuration at the node storing the list (e.g., P2), as mentioned above. Node field 605 identifies the particular nodes/routers of the network, such as, e.g., P1, and n1-n3, etc. Each node is associated with an indication of whether their failure/removal identifies possible traffic redirection in the corresponding field 610. For example, assume that P1 is a headend node of one or more TE-LSPs (e.g., T1 and T2), and that nodes n1-n3 are not head-end nodes. According to the list 600, only a failure/removal of P1 identifies possible traffic redirection. The list 600 is illustratively maintained and managed by TE services 244, and stored in the TE Database 246, or otherwise in memory 240. Those skilled in the art will understand that the list 600 as shown is merely representative, and is not meant to be limiting to the scope of the present invention. Other possible table arrangements and/or mechanisms known in the art could also be used to store the reserved resources, such as tables, access lists, pointers, flags, etc., which are within the scope of the present invention.

In accordance with another aspect of the present invention, upon receiving notification of an event identifying possible traffic redirection, the local head-end node enters a Fast Resize (FR) state. In the FR state, preconfigured (faster) sampling and resizing frequencies are initiated to quickly adapt its TE-LSP bandwidth(s) to any received redirected traffic. The sample/resize frequencies during FR are configured to be higher (e.g., significantly higher) than the sample/resize frequencies in steady. In the example given above, the sample/resize frequencies in steady state were 5 minutes and one hour (5 min/1 hour) respectively. Example sample/resize frequencies in FR that are higher may be configured at 1 minute and 5 minutes (1 min/5 mins) respectively. During FR, the TE-LSPs originating at the local head-end node (P2) adapt more quickly to changes in traffic pattern resulting from traffic redirection (e.g., caused by a failure of P1). For instance, as the traffic originally destined to the remote head-end node (P1) is redirected to the local head-end node (P2), the TE-LSPs originating at P2 (T3 and T4) need to quickly accommodate the additional traffic that would have been traversing TE-LSPs of P1 (T1 and T2). By dynamically increasing the sample/resize frequencies in anticipation of the resulting traffic redirection, the TE-LSPs of the local head-end node may be more appropriately sized than they would be with slower sample/resize frequencies.

After expiration of a configurable timer (e.g., 15 minutes), the frequencies may be returned to their steady state values, since the redirection of traffic, e.g., from a remote head-end node to the local head-end node, may generally only be a short burst until the necessary traffic is redirected. For example, before expiration of the timer, all PE routers (PE1 and PE2) may have successfully redirected all their traffic to the local head-end node (P2) and, as such, the faster sample/resize frequencies may no longer be needed (i.e., the system is in steady state, with all traffic traversing P2). This may be the case where the remote head-end node (P1) has been permanently removed, or where any repair/restoration may require a substantial length of time. By returning to steady state values for the sample/resize frequencies, the network is able to adapt to gradual changes in traffic patterns without compromising network stability, as described above.

In the event the failed/removed network element (e.g., a remote head-end node) is restored, or a new element added, (e.g., as learned through IGP Advertisements 300) the local head-end node may substantially immediately return its TE-LSPs to an original (i.e., pre traffic redirection) bandwidth (size). Assuming, for example, that the original size of T3 was 5 MB, and that through the course of FR and traffic redirection, T3 was dynamically (and quickly) increased to 10 MB. P2 would have stored the original value (5 MB), and may be configured to assume that once P1 is restored, the redirected traffic will return to its original path, and hence T3 no longer requires the increased resources, and may thus be reduced to its original size. Importantly, in some instances the increased size of the dynamically increased TE-LSPs might interfere with the establishment of the restored/added TE-LSPs (e.g., from P1). For example, if the TE-LSPs from both the local head-end node P2 and the remote head-end node P1 share resources, it may be necessary for P1 to "double book" resources in order to establish its TE-LSPs, as would be understood by those skilled in the art. Accordingly, by reducing the size of the local head-end node's TE-LSPs upon restoration/addition of the new network element (e.g., P1), the need for double booking is substantially obviated.

Alternatively, the local head-end node may reenter an FR state to quickly adapt (e.g., decrease) the bandwidth (size) of its TE-LSPs to account for the traffic redirection to the restored/added network element. This FR state may be performed in accordance with the methods described above referencing a failed/removed network element, and the increase of size. Particularly, the FR state would assist in quickly adapting the traffic being redirected away from the local head-end node, thereby preventing the local head-end node from over-utilizing network resources, as mentioned above. Notably, the restored/added remote head-end node (P1) may also reestablish its original TE-LSPs at their original sizes, or may instead enter a FR state to quickly adapt (e.g., increase) the is bandwidth (size) of its TE-LSPs to account for the received redirected traffic.

Figure 7:
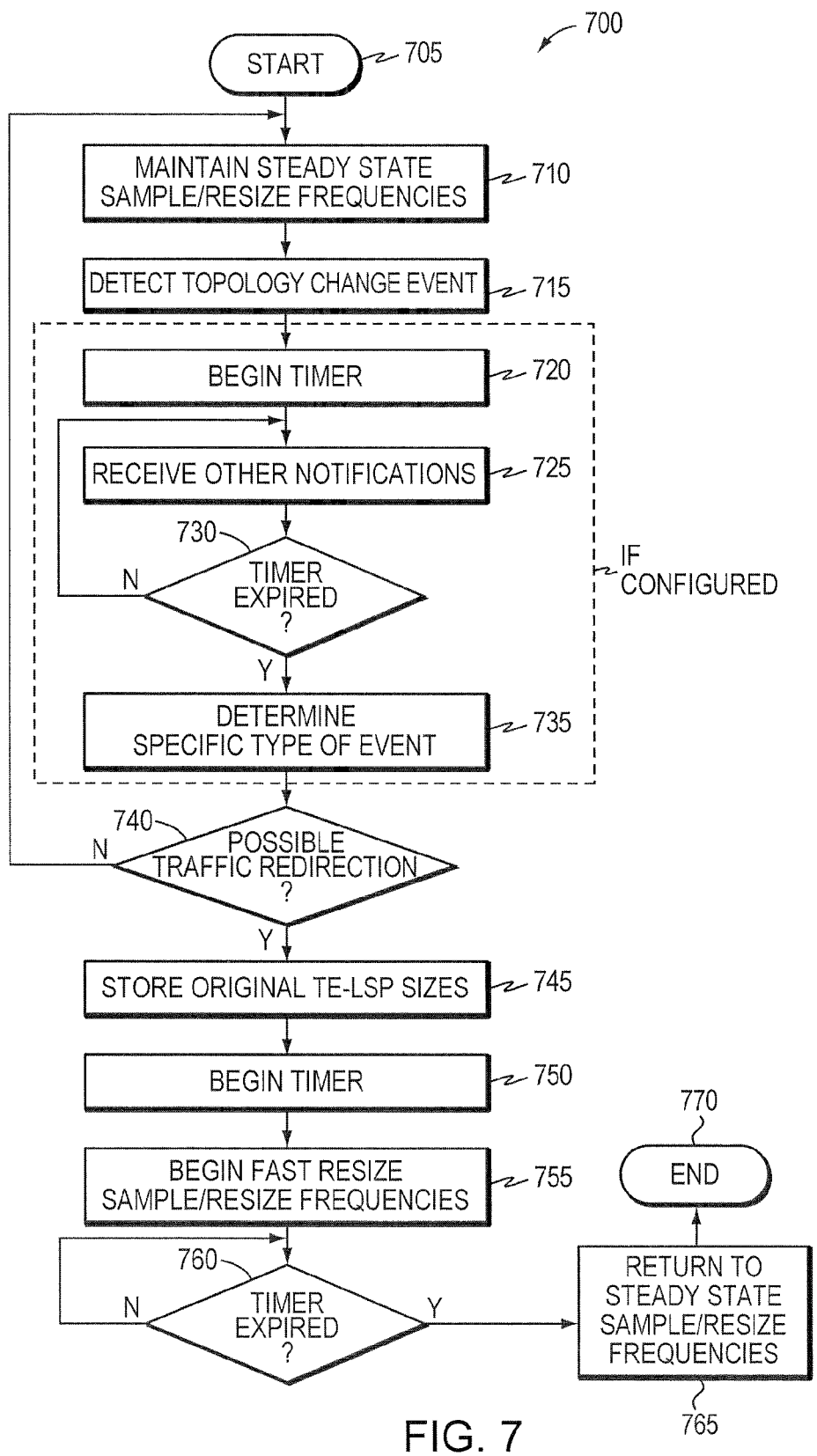
FIG. 7 is a flowchart illustrating a sequence of steps for preparing to receive redirected traffic in accordance with the present invention.

FIG. 7 is a flowchart illustrating a sequence of steps for preparing to receive redirected traffic in accordance with the present invention. Sequence 700 starts at step 705 and continues to step 710 where the head-end node maintains steady state sample/resize frequencies (e.g., 5 mins/1 hour), until a topology change event is detected in step 715. If configured to perform steps 720 through 735, the head-end node begins a timer (e.g., 30 seconds) at step 720 for which it may receive other notifications of the event in step 725. If the timer has not expired in step 730, the head-end node awaits further notifications in step 725, and continues to do so until expiration of the timer in step 730. At step 735, the head-end node uses the received notifications to determine the specific type of event (e.g., node or link failure), as described above.

At step 740, the head-end node determines whether the event indicates possible traffic redirection. If not, (e.g., the event is a new prefix or a refresh message), the sequence returns to step 710 to maintain steady state sample/resize frequencies. If, however, the event indicates possible traffic redirection, the sequence continues to step 745 where the original TE-LSP sizes (bandwidths) of any current TE-LSPs at the head-end node are stored, and step 750 where a timer for Fast Resize (e.g., 15 minutes) is begun. At step 755, the head-end node begins its use of Fast Resize sample/resize frequencies (e.g., 1 min/5 mins) as described above, until expiration of the timer in step 760. Once the timer expires, the head-end node returns to the steady-state sample/resize frequencies in step 765, e.g., with TE-LSPs whose bandwidths have been resized due to traffic redirection. The sequence ends at step 770.

Figure 8:
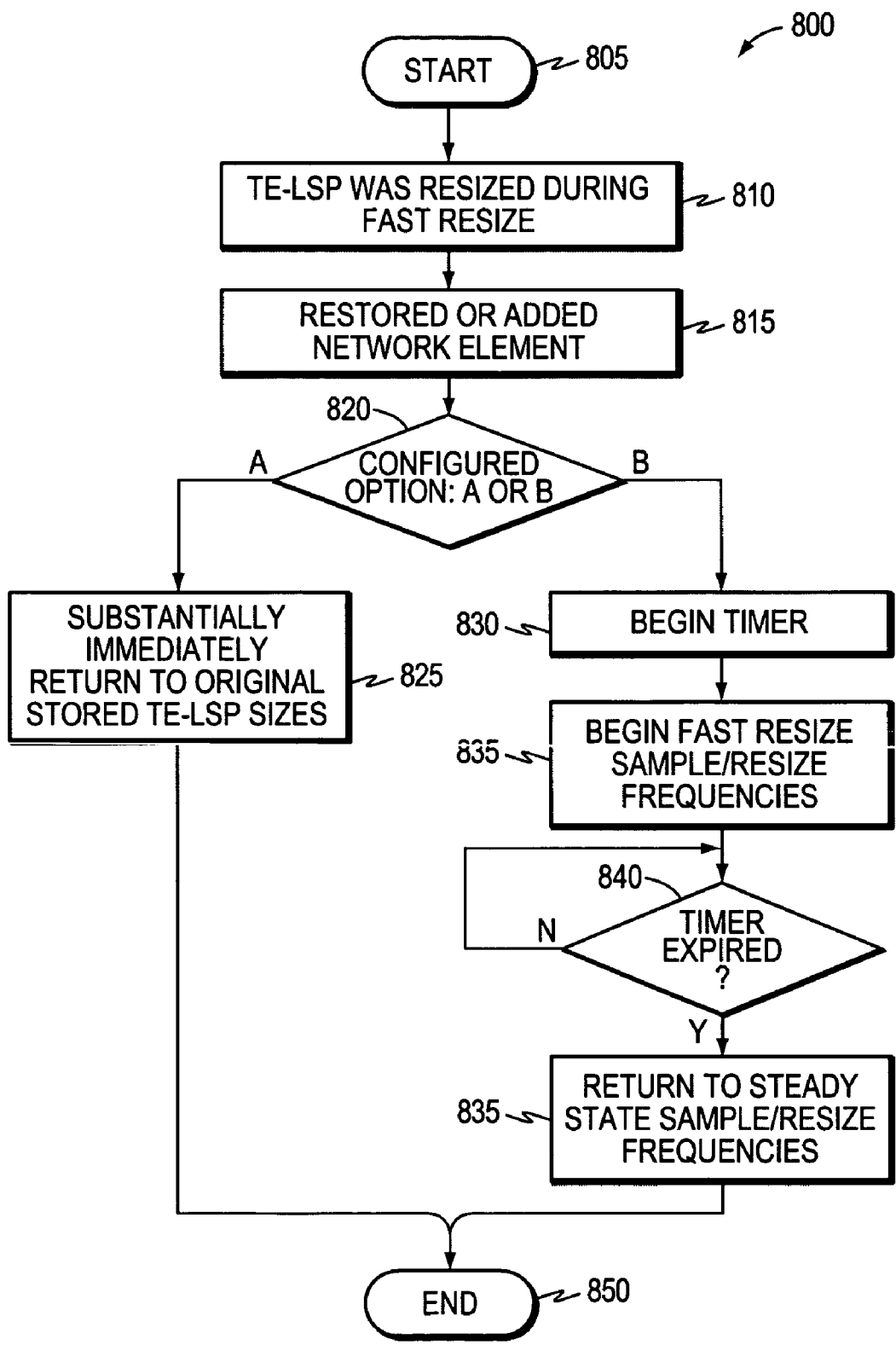
FIG. 8 is a flowchart illustrating a sequence of steps for responding to a restored/added network element in accordance with the present invention.

FIG. 8 is a flowchart illustrating a sequence of steps for responding to a restored/added network element in accordance with the present invention. Sequence 800 starts at step 805 and continues to step 810 where the bandwidth of at least one TE-LSP at the head-end node has been resized during Fast Resize, such as according to FIG. 7 and as described in detail herein. At step 815, the failed network element is restored or a new network element is added, as learned by the head-end node, e.g., through IGP advertisements 300. Depending on the configuration of the head-end node at step 820, the headend node may either perform a set of steps "A" or a set "B." In optional set "A," upon receiving notification of the restored/added network element, the head-end node substantially immediately returns to the original stored TE-LSP bandwidths (sizes), as stored in FIG. 7 mentioned above, under the assumption that the redirected traffic to the head-end node will return to the restored/added network element. The sequence then ends at step 850. If, however, the head-end node is configured for optional set "B," a timer for Fast Resize (e.g., 15 minutes) is begun at step 830, and at step 835, the head-end node begins its use of Fast Resize sample/resize frequencies (e.g., 1 min/5 mins) as described above, until expiration of the timer in step 840. Once the timer expires, the head-end node returns to the steady-state sample/resize frequencies in step 845, e.g., with TE-LSPs that have been adaptively resized due to traffic redirection to the restored/added network element. The sequence ends at step 850.

Advantageously, the novel technique dynamically resizes TE-LSP bandwidths at a head-end node of the TE-LSPs in preparation to receive redirected traffic in response to an event in a computer network. By dynamically adjusting the frequency of sampling/resizing TE-LSPs, the inventive technique provides a mechanism for efficiently responding to traffic redirection in which traffic is quickly shifted from a remote head-end node to a local head-end node. Accordingly, the novel technique avoids inefficient manual configuration of TE-LSP size to cope with traffic redirection, as well as the problems associated with fixed TE-LSP sample/resize frequencies.

While there has been shown and described an illustrative embodiment that dynamically resizing TE-LSPs at a head-end node of the TE-LSPs in preparation to receive redirected traffic in response to an event in a computer network, it is to be understood that various other adaptations and modifications may be made within the spirit and scope of the present invention. Notably, the invention has been shown and described herein using IGP messages and extensions to IGP to transmit the event notifications. However, the invention in its broader sense is not so limited, and may, in fact, be used with other means for flooding the notifications to routers. For instance, other communication protocols may be advantageously used in accordance with the present invention. Moreover, while the above description describes performing the technique at the head-end node, the invention may also be advantageously used with PCEs. In addition, while various times have been suggested for the sample/resize frequencies in steady state and Fast Resize state, those skilled in the art will understand that any values may be advantageously used in accordance with the present invention.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for dynamically resizing Traffic Engineering (TE) Label Switched Paths (LSPs) at a head-end node of the TE-LSPs in preparation to receive redirected traffic in response to an event in a computer network, the method comprising:
   maintaining, by the head-end node, steady state TE-LSP sampling and resizing frequencies, wherein a TE-LSP sampling frequency is a frequency at which an amount of traffic on one or more TE-LSPs is measured, and a TE-LSP resizing frequency is a frequency at which one or more TE-LSPs are resized, the TE-LSP resizing frequency being a lower frequency than the TE-LSP sampling frequency;
   detecting an event in the computer network identifying possible traffic redirection;
   in response to the detecting, entering a Fast Resize (FR) state, in which TE-LSP sampling and resizing frequencies are increased from the steady state TE-LSP sampling and resizing frequencies to FR state TE-LSP sampling and resizing frequencies, to speed adaptation of a TE-LSP bandwidth to accommodate any received redirected traffic; and
   after the FR state is completed, returning to using the steady state TE-LSP sampling and resizing frequencies.

2. The method as in claim 1, further comprising:
   receiving a notification indicating the event.

3. The method as in claim 2, wherein the notification is an Interior Gateway Protocol (IGP) message.

4. The method as in claim 1, wherein the event is a network topology change.

5. The method as in claim 4, further comprising:
   determining a type of topology change prior to identifying possible traffic redirection.

6. The method as in claim 5, further comprising:
   waiting to receive further notifications.

7. The method as in claim 5, further comprising:
   identifying possible traffic redirection if the topology change involves a head-end node of TE-LSPs.

8. The method as in claim 6, further comprising:
   waiting for a configurable length timer.

9. The method as in claim 6, further comprising:
   determining a type of topology change prior to identifying possible traffic redirection based on the further notifications.

10. The method as in claim 1, further comprising:
    maintaining a list of network elements, each network element of the list being associated with a value indicating whether an event that involves the network element identifies possible traffic redirection.

11. The method as in claim 10, further comprising:
    manually configuring the list.

12. The method as in claim 10, further comprising:
    dynamically creating the list.

13. The method as in claim 1, further comprising:
    completing the FR state after expiration of a configurable timer.

14. The method as in claim 1, further comprising:
    storing TE-LSP bandwidth sizes prior to entering the FR state;
    determining one of the following: i) that a network element that caused the event has been restored, and ii) that a new network element has been added; and in response substantially immediately returning to the stored TE-LSP bandwidth sizes.

15. The method as in claim 1, further comprising:
determining one of the following: i) that a network element that caused the event has been restored, and ii) that a new network element has been added; and in response entering the FR state.

16. The method as in claim 1, further comprising:
while in the FR state, sampling loads on the TE-LSPs at increased sampling frequencies and resizing at least some of the TE-LSPs at increased resizing frequencies.

17. An apparatus for dynamically resizing Traffic Engineering (TE) Label Switched Paths (LSPs) at a head-end node of the TE-LSPs in preparation to receive redirected traffic in response to an event in a computer network, the apparatus comprising:
means for maintaining steady state TE-LSP sampling and resizing frequencies, wherein a TE-LSP sampling frequency is a frequency at which an amount of traffic on one or more TE-LSPs is measured, and a TE-LSP resizing frequency is a frequency at which one or more TE-LSPs are resized, the TE-LSP resizing frequency being a lower frequency than the TE-LSP sampling frequency;
means for detecting an event in the computer network identifying possible traffic redirection;
means for, in response to the event, entering a Fast Resize (FR) state, in which TE-LSP sampling and resizing frequencies are increased from the steady state TE-LSP sampling and resizing frequency to FR state TE-LSP sampling and resizing frequencies, to speed adaptation of a TE-LSP bandwidth to accommodate any received redirected traffic; and
means for returning, after the FR state is completed, to using the steady state TE-LSP sampling and resizing frequencies.

18. A system for dynamically resizing Traffic Engineering (TE) Label Switched Paths (LSPs) in preparation to receive redirected traffic in response to an event in a computer network, the system comprising:
a head-end node of the TE-LSPs;
a memory for storing a TE-LSP sampling frequency and a TE-LSP resizing frequency, wherein the TE-LSP sampling frequency is a frequency at which an amount of traffic on one or more TE-LSPs is measured, and the TE-LSP resizing frequency is a frequency at which one or more TE-LSPs are resized, the TE-LSP resizing frequency being a lower frequency than the TE-LSP sampling frequency; and
wherein the head-end node receives a notification indicating an event in the computer network identifying possible traffic redirection, wherein the head-end node enters a Fast Resize (FR) state in response to receiving the notification, in which the TE-LSP sampling frequency and TE-LSP resizing frequency are increased from a steady state TE-LSP sampling frequency and a steady state TE-LSP resizing frequency to a FR state sampling frequency and a FR state TE-LSP resizing frequency, to speed adaptation of a TE-LSP bandwidth to accommodate any received redirected traffic, and wherein the head-end node returns, after the FR state is completed, to use of the steady state TE-LSP sampling frequency and the steady state TE-LSP resizing frequency.

19. A node for dynamically resizing Traffic Engineering (TE) Label Switched Paths (LSPs) in preparation to receive redirected traffic in response to an event in a computer network, the node comprising:
a memory, the memory configured to store a TE-LSP sampling frequency and a TE-LSP resizing frequency, wherein the TE-LSP sampling frequency is a frequency at which an amount of traffic on one or more TE-LSPs is measured, and the TE-LSP resizing frequency is a frequency at which one or more TE-LSPs are resized, the TE-LSP resizing frequency being a lower frequency than the TE-LSP sampling frequency;
a network interface configured to receive a notification indicating an event in the computer network identifying possible traffic redirection; and
a processor configured to initiate a Fast Resize (FR) state at the node in response to receiving the notification, to increase the TE-LSP sampling frequency and TE-LSP resizing frequency from a steady state TE-LSP sampling frequency and a steady state TE-LSP resizing frequency to a FR state TE-LSP sampling frequency and a FR state TE-LSP resizing frequency, to speed adaptation of a TE-LSP bandwidth to accommodate any received redirected traffic, and, after the FR state is completed, to return to use of the steady state TE-LSP sampling frequency and the steady state TE-LSP resizing frequency.

20. The node as in claim 19, wherein the notification is an Interior Gateway Protocol (IGP) message.

21. The node as in claim 19, wherein the event is a network topology change.

22. The node as in claim 19, wherein the processor is further configured to determine an event identifies possible traffic redirection if the event is a topology change involving a head-end node of TE-LSPs.

23. The node as in claim 19 wherein the memory is further configured to store a list of network elements, each network element of the list being associated with a value indicating whether an event that involves the network element identifies possible traffic redirection.

24. The node as in claim 19 wherein the processor is further configured to, while in the FR state, sample loads on the TE-LSPs at the increased sampling frequency and resizing at least some of the TE-LSPs at the increased resizing frequency.

25. A method comprising:
using a steady state Traffic Engineering (TE) Label Switched Path (LSP) sampling frequency and a steady state TE-LSP resizing frequency at a head-end node of one or more TE-LSPs in a computer network, wherein a TE-LSP sampling frequency is a frequency at which an amount of traffic on one or more TE-LSPs is measured, and a TE-LSP resizing frequency is a frequency at which one or more TE-LSPs are resized, the TE-LSP resizing frequency being a lower frequency than the TE-LSP sampling frequency;
detecting a network topology change;
determining whether the detected network topology change indicates possible traffic redirection;
in response to the detected network topology change indicating possible traffic redirection, beginning to use a Fast Resize (FR) state TE-LSP sampling frequency and a FR state TE-LSP resizing frequency at the head-end node, wherein the FR state TE-LSP sampling frequency and the FR state TE-LSP resizing frequency are higher frequencies than the steady state TE-LSP sampling frequency and the steady state TE-LSP resizing frequency, respectively; and
after a period of time, returning to using the steady state TE-LSP sampling frequency and the steady state TE-LSP resizing frequency at the head end node.

26. The method of claim 25, wherein the beginning to use further comprises:

measuring the amount of traffic on one or more TE-LSPs at the FR state TE-LSP sampling frequency and resizing at least some of the one or more TE-LSPs at the FR state TE-LSP resizing frequency.

27. The method as in claim 25, wherein the detecting further comprises:

concluding the detected network topology change indicates possible traffic redirection if the network topology change involves a head-end node of one or more TE-LSPs.

28. The method as in claim 25, further comprising:

waiting for the period of time according to a configurable length timer.

* * * * *